(12) United States Patent
Sun et al.

(10) Patent No.: US 8,437,354 B2
(45) Date of Patent: May 7, 2013

(54) METHOD AND APPARATUS FOR REALIZING UNICAST REVERSE PATH FORWARDING

(75) Inventors: Peng Sun, Shenzhen (CN); Yuping Zhan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 217 days.

(21) Appl. No.: 13/061,002

(22) PCT Filed: Dec. 19, 2008

(86) PCT No.: PCT/CN2008/073620
§ 371 (c)(1),
(2), (4) Date: Feb. 25, 2011

(87) PCT Pub. No.: WO2010/022574
PCT Pub. Date: Mar. 4, 2010

(65) Prior Publication Data
US 2011/0158240 A1    Jun. 30, 2011

(30) Foreign Application Priority Data
Aug. 29, 2008   (CN) .......................... 2008 1 0214832

(51) Int. Cl.
*H04L 12/28* (2006.01)
(52) U.S. Cl.
USPC ........................... 370/392; 370/255; 709/240
(58) Field of Classification Search .................. 370/392, 370/255; 709/240
See application file for complete search history.

(56) References Cited

U.S. PATENT DOCUMENTS

| 6,804,234 | B1 | 10/2004 | Chow |
| 7,203,175 | B2 | 4/2007 | Thubert et al. |
| 7,263,559 | B2 | 8/2007 | Yao et al. |
| 2004/0006712 | A1 | 1/2004 | Yao et al. |
| 2004/0032852 | A1 | 2/2004 | Thubert et al. |
| 2005/0265259 | A1* | 12/2005 | Thubert et al. ................. 370/255 |
| 2007/0230410 | A1* | 10/2007 | Thubert et al. ................. 370/338 |
| 2010/0238811 | A1* | 9/2010 | Rune ............................. 370/248 |

FOREIGN PATENT DOCUMENTS

| CN | 1466341 A | 1/2004 |
| CN | 1567900 A | 1/2005 |
| CN | 1675896 A | 9/2005 |
| CN | 1750512 A | 3/2006 |
| CN | 1852231 A | 10/2006 |
| JP | 2004363913 A | 12/2004 |

OTHER PUBLICATIONS

International Search Report on international application No. PCT/CN2008/073620, mailed on Jun. 4, 2009.

(Continued)

*Primary Examiner* — Wei Zhao
(74) *Attorney, Agent, or Firm* — Oppedahl Patent Law Firm LLC

(57) ABSTRACT

The present invention discloses a method and apparatus for realizing unicast reverse path forwarding. In this method, an access equipment snoops into and obtains an announcement message from a router, wherein the announcement message contains address prefix information; the access equipment establishes a prefix table based on the obtained address prefix information, receives an access request message from a customer premises equipment, determines whether a source IP address of the access request message exists in the prefix table, and decides whether to forward the message to the router based on a result of determining. According to the technical solution provided by the present invention, the message from the customer premises equipment is processed through the obtained routing information of the router interface, thus a pseudo data packet can be filtered out, and address filter control is realized at the access equipment.

5 Claims, 4 Drawing Sheets

OTHER PUBLICATIONS

English Translation of the Written Opinion of the International Search Authority in international application No. PCT/CN2008/073620, mailed on Jun. 4, 2009.
Notification of the First Office Action of Chinese application No. 200810214832.8, issued on May 11, 2011.
Tools Available for Securing IPv6 Networks.
Unicast Reverse Path Forwarding for IPv6 on the Cisco 12000 Series Internet Router.
Ingress Filtering for Multihomed Networks; rfc3704. txt.
Networks Ingress Filtering: Defeating Denial of Service Attacks Which Employ IP Source Address Spoofing; Rfc2827. txt.
Supplementary European Search Report in European application No. 08876817.1, mailed Jul. 14, 2011.

* cited by examiner

METHOD AND APPARATUS FOR REALIZING UNICAST REVERSE PATH FORWARDING

TECHNICAL FIELD

The present invention relates to the field of communications, and more particularly, relates to a method and apparatus for realizing unicast reverse path forwarding (URPF).

BACKGROUND

In a network attack using a pseudo source address, a hacker machine sends a great number of transmission control protocol (TCP) synchronization (SYN) messages with pseudo source addresses to a victim host computer, thus occupying network address translation (NAT) session resources of a security gateway, finally fully occupying a NAT session table of the security gateway, and causing all customers within a local area network unable to use the network normally.

URPF is an effective measure for enhancing routing security, and is mainly used for preventing source address spoofing-based network attack behaviors. URPF employs the following data packet forwarding mechanism: when a router receives a data packet, it checks a routing table and determines whether the routing that returns the source IP address of the data packet enters from an interface where the data packet is received; if yes, the data packet is forwarded normally; otherwise, it is deemed that the source IP address is a pseudo address, and then the data packet is discarded. A reverse routing forwarding mechanism plays a certain role in preventing attacks carried out through malicious pseudo source address and distributed denial of service (DDoS).

For example, if a router receives a data packet with a source IP address of a, but there is no route (namely the route required for reverse data packet transmission) provided for the IP address of a in the routing table, then the router will discard the data packet. The URPF prevents an SMURF attack and other IP address disguise-based attacks at an internet server provider (ISP) (office end), in this way, the network and clients can be protected from intrusion from the internet and other places.

From the perspective of protection effect, the equipment is more marginal, the network protection effect is better. Meanwhile, for a marginal equipment, the network traffic is relatively lower, and network forwarding performance is little influenced when the protection function is activated.

Therefore, it is vital to realize URPF. However, an IPv6 network lacks a technology for realizing source address filter control at a bandwidth access equipment at present.

SUMMARY

In view of the above problem that an access equipment lacks a technology of source address filter control, the present invention aims to provide a method and apparatus for realizing URPF.

In order to achieve the above objective of the present invention, according to one aspect of the present invention, there is provided a method for realizing URPF. The method is applied in an IPv6 network, wherein the IPv6 network comprises an access equipment, a router, and a customer premises equipment.

The method for realizing URPF according to the present invention comprises: the access equipment snoops into and obtains an announcement message from the router, wherein the announcement message contains address prefix information; the access equipment establishes a prefix table based on the obtained address prefix information; and the access equipment receives an access request message from the customer premises equipment, determines whether the source IP address of the access request message exists in the prefix table, and decides whether to forward the message to the router based on the result of determining.

Preferably, under the circumstances that the announcement message snooped into and obtained by the access equipment is sent periodically by the router according to a predetermined period, and if the access equipment obtains a new announcement message, the method may further comprise: the access equipment updates information recorded in the prefix table.

Preferably, the method may further comprise: aging the information recorded in the prefix table if the information recorded in the prefix table is not updated within a predetermined time.

Preferably, the deciding whether to forward the message based on the result of determining may be specifically: forwarding the message to the router if the result of determining is yes; and discarding the message if the result of determining is no.

According to another aspect of the present invention, there is further provided an apparatus for realizing URPF, the apparatus is applied in an IPv6 network, wherein the IPv6 network comprises an access equipment, a router, and a customer premises equipment.

The apparatus for realizing URPF according to the present invention is arranged in the access equipment in the IPv6 network, the apparatus comprises: a snooping and obtaining module, an establishing module, a receiving module and a forwarding module, wherein the snooping and obtaining module is for snooping into and obtaining an announcement message from the router, wherein the announcement message contains address prefix information; the establishing module is for establishing a prefix table based on the obtained address prefix information; the receiving module is for receiving an access request message from the customer premises equipment; and the forwarding module is for forwarding the message to the router if the source IP address of the access request message exists in the prefix table established by the establishing module.

Preferably, the above apparatus may further comprise a determining module connected to the receiving module and the forwarding module, for determining whether the source IP address of the access request message exists in the prefix table established by the establishing module; and if the result of determining is yes, the forwarding module may be executed.

Preferably, under the circumstances that the announcement message snooped into and obtained by the snooping and obtaining module is sent periodically by the router according to a predetermined period, and if the snooping and obtaining module obtains a new announcement message, the apparatus may further comprise an updating module connected to the snooping and obtaining module and the establishing module, for updating information recorded in the prefix table.

Preferably, the apparatus may further comprise an aging module connected to the establishing module, for aging recorded information that has not been updated within a predetermined time in the prefix table.

Preferably, the establishing module may transmit the established prefix table to the forwarding module in a manner of access control list.

Through the above technical solutions of the present invention, a message coming from a customer premises equipment is processed based on the obtained routing information of a router interface, compared to the prior art, the present invention solves the problem that an access equipment lacks a technology of source address filter control, this invention thus can filter out a pseudo data packet, thereby realizing address filter control at the access equipment.

BRIEF DESCRIPTION OF THE DRAWINGS

The accompanying drawings illustrated here provide further understanding to the present invention and constitute a part of the present application. The exemplary embodiments of the present invention and the illustrations thereof are used for explaining the present invention, instead of constituting an improper limitation to the present invention. In the accompanying drawings.

DETAILED DESCRIPTION OF THE INVENTION

Functional Overview

In an IPv6 network, a router interface may periodically issue an announcement message comprising link prefix, link maximum transmission unit (MTU), public network routing and other information. A wideband access equipment may obtain routing information of the router interface through snooping into this message, thereby realizing IPv6 network-based source address filter control.

Hereinafter, preferred embodiments of the present invention will be illustrated with reference to the accompanying drawings. It should be understood that the preferred embodiments as described here are only for illustrating and explaining the present invention, not for limiting the present invention. Without conflicts, the embodiments and the features in the embodiments may be combined one another.

The following description only provides exemplary embodiment(s), but not for limiting the scope, applicability or configuration of this disclosure. On the contrary, the following depiction of the exemplary embodiment(s) can provide depiction of exemplary embodiments for realizing this disclosure to those skilled in the art. It should be understood that, without departing from the spirit and scope as illustrated in the appended claims, various changes may be made to functions and arrangements of the elements.

Method Embodiments

According to embodiments of the present invention, a method for realizing URPF is provided.

Figure 1:
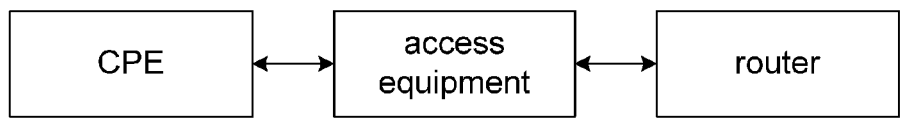
FIG. 1 is a schematic diagram of a network application scenario according to an embodiment of the present invention.

The method for realizing URPF according to embodiments of the present invention is applied in an IPv6 network. FIG. 1 is a schematic diagram of a network application scenario according to an embodiment of the present invention. As illustrated in FIG. 1, the IPv6 network at least comprises an access equipment, a router, and a customer premises equipment (CPE). Wherein the access equipment may be, but not limited to, one of the following: a multi-service access node (MSAN), a digital subscriber line access multiplexer (DSLAM), and an optical line terminal (OLT).

Figure 2:
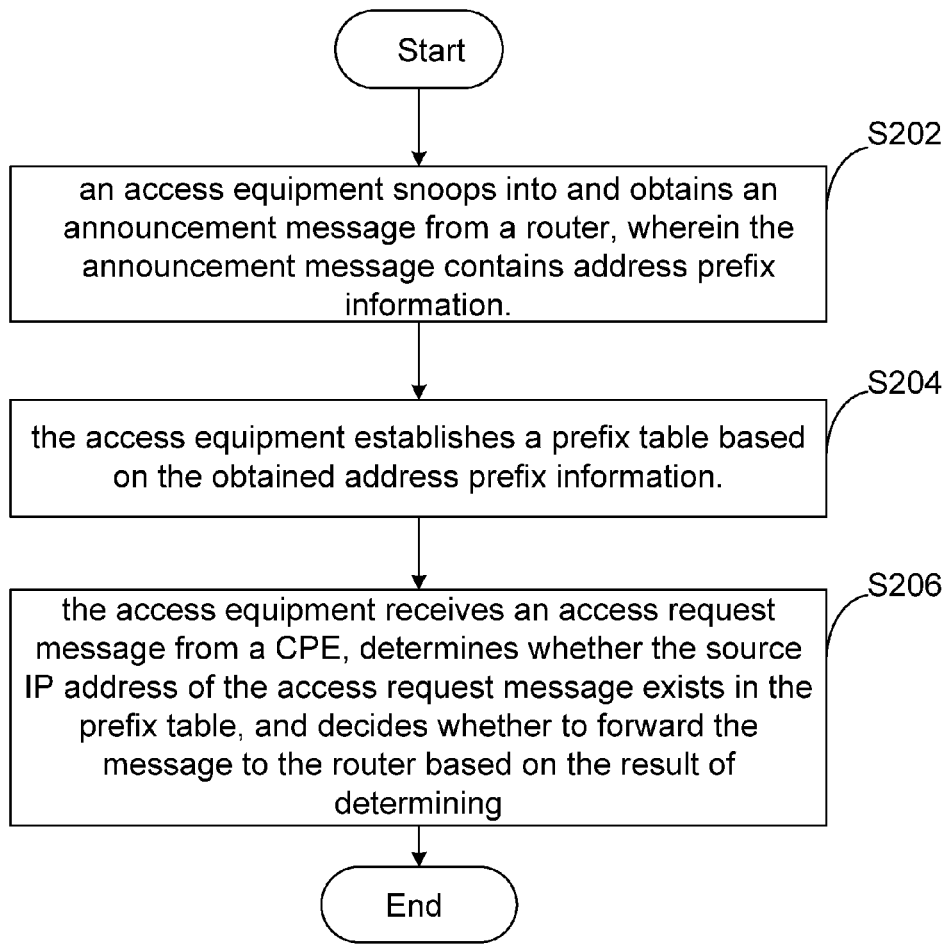
FIG. 2 is a flow chart of a method for realizing URPF according to an embodiment of the present invention.

FIG. 2 is a flow chart of a method for realizing URPF according to an embodiment of the present invention. As illustrated in FIG. 2, the method for realizing URPF according to an embodiment of the present invention mainly comprises the following steps (S202-S206):

Step S202, an access equipment snoops into and obtains an announcement message from a router, wherein the announcement message contains address prefix information;

Step S204, the access equipment establishes a prefix table based on the obtained address prefix information;

Step S206, the access equipment receives an access request message from a CPE, determines whether the source IP address of the access request message exists in the prefix table, and decides whether to forward the message to the router based on the result of determining.

Figure 3:
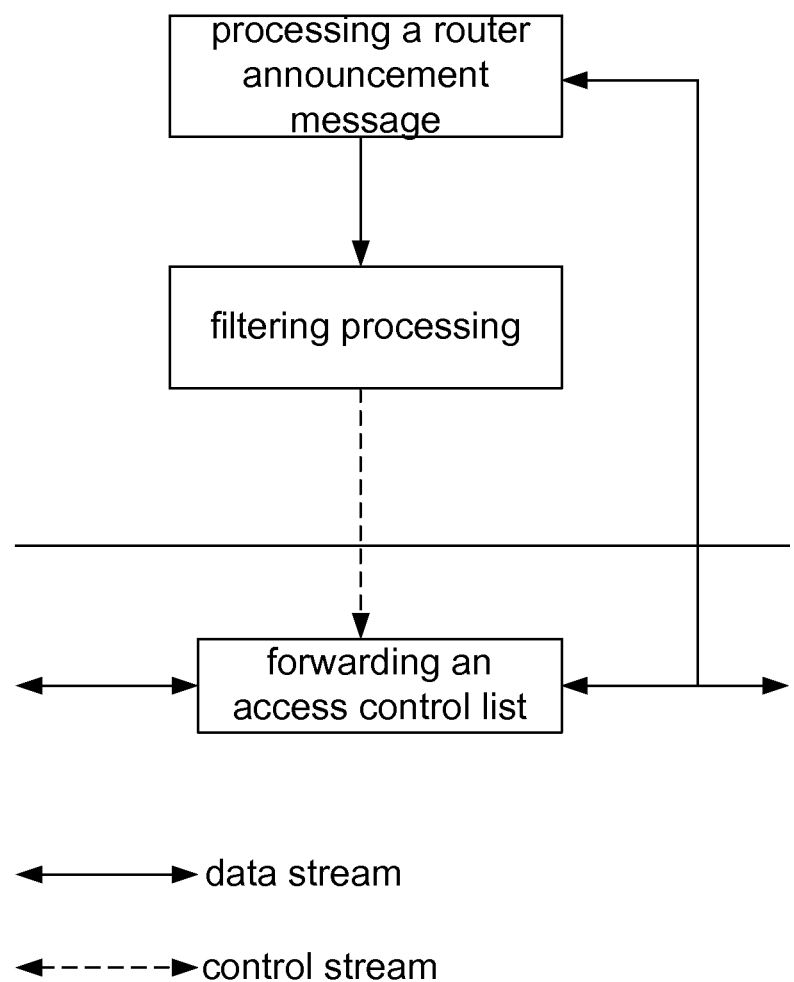
FIG. 3 is a schematic diagram of a realization principle according to a method embodiment of the present invention.

Hereinafter, the details of the above processing are further described in FIG. 3 which is a schematic diagram of a realization principle according to a method embodiment of the present invention.

(1) Step S202

The router interface periodically issues an announcement message, the router announcement message comprising the following information: link prefix, link MTU, specific routing, whether to use automatic address configuration, valid period, etc. The access equipment (or wideband access equipment) snoops into the announcement message sent from the router and receives the router announcement message via an uplink port. Since the received router announcement message further needs to be forwarded to the CPE, it is necessary to copy the announcement message received via the uplink port, wherein one copy is sent to the CPU of the access equipment for processing, and another copy is normally forwarded to the CPE.

(2) Step S204

Figure 4:
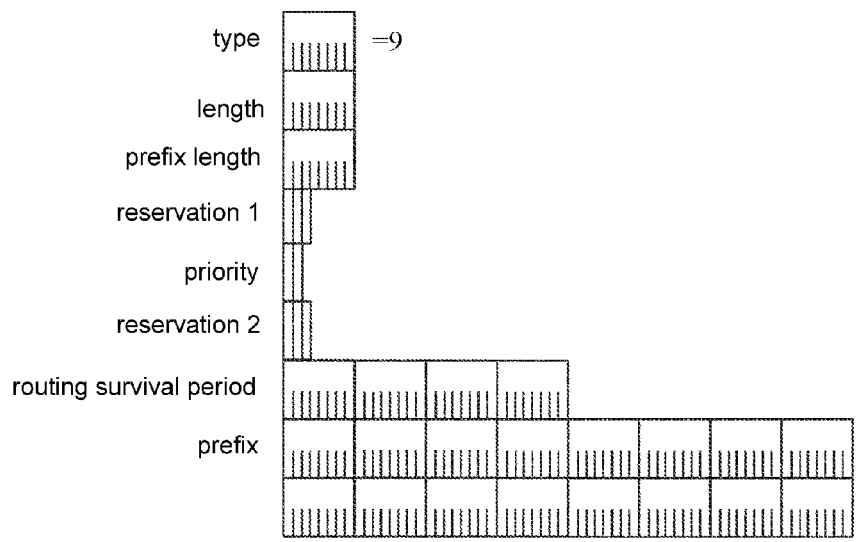
FIG. 4 is a schematic diagram of a message structure according to a method embodiment of the present invention.

The access equipment obtains the address prefix information in the router announcement message, processes the message according to the message format as illustrated in FIG. 4, automatically establishes a prefix table as illustrated in Table 1 based on the address prefix information, and then fills the address prefix information in the following prefix table.

TABLE 1

| Prefix address | Mask | Aging identification |
| --- | --- | --- |
|  |  |  |

The automatically generated prefix table is downloaded to a forwarding plane through an access control list (ACL). The ACL is a global ACL, all data from the customer premises line are required to be processed through the ACL before being forwarded.

Generally, the generated prefix control ACL may be in the following form:

Permit ip which in pre-fix-table

Deny all

Each record in the prefix table is required to be aged to adapt to the change of the router interface address. A new IP network segment prefix will be issued after the router reconfigures addresses. According to the above step, the access equipment can obtain a new IP address, so that uplink transmission of data of the following new IP network segments is implemented via the access equipment. Preferably, original old records are subject to aging processing so as to clear the junk data in the system.

Aging is performed based on the following principle: on the premise that an announcement message has arrived at the router, if the record that the announcement message has arrived at the router has not been indicated and processed after refreshing has been performed for three times, it is deemed that this record has been deleted at the router interface.

The above processing can not only age the record, but also prevent the circumstances in which data messages cannot be sent or the issuing time of messages is changed due to a temporary failure of the router, thus resulting in the access equipment mistakenly deleting a valid record.

(3) Step S206

The access equipment receives an access request message from a CPE. For any received message, it is required to first query the prefix table; only the data messages whose source IP addresses exist in the prefix table can be forwarded, and those data messages whose IP source addresses do not exist in the prefix table will be discarded.

According to the method depicted in the above embodiment of the present invention, the message coming from the CPE is processed based on the obtained routing information of the router interface, thus a pseudo data packet can be filtered out and address filter control can be implemented at the access equipment.

Figure 5:
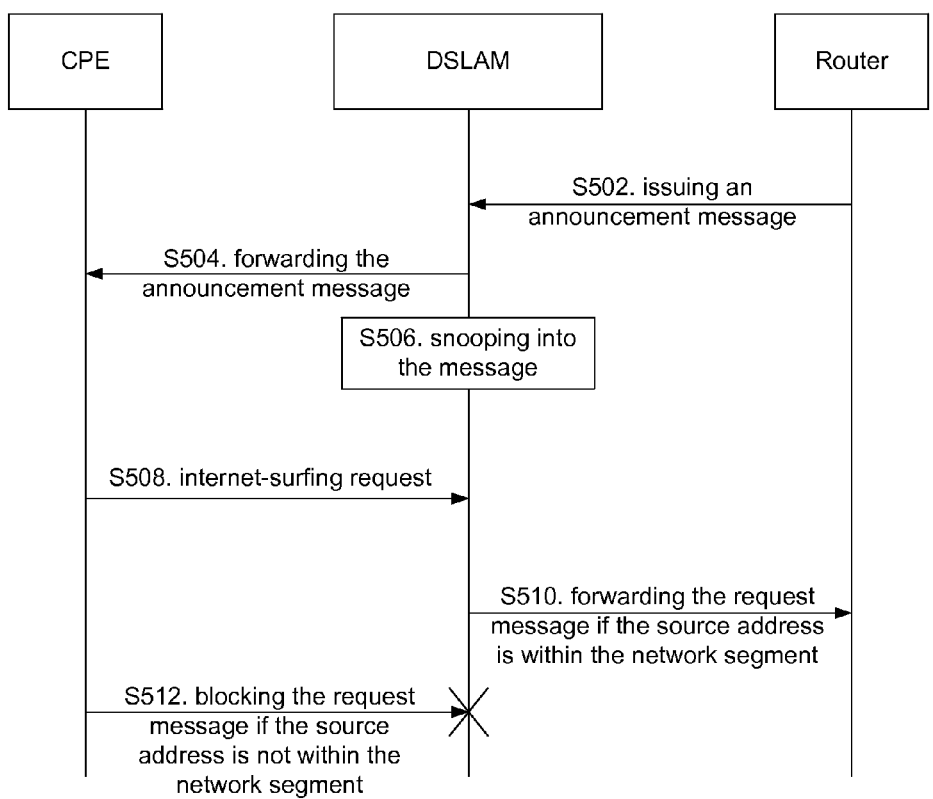
FIG. 5 is a flow chart of a method for realizing URPF according to a preferred embodiment of the present invention.

FIG. 5 is a flow chart of a method for realizing URPF according to a preferred embodiment of the present invention. As illustrated in FIG. 5, the method for realizing URPF according to a preferred embodiment of the present invention mainly comprises the following steps.

Step S502, the router periodically issues an announcement message, wherein the announcement message comprises link prefix, link MTU, public network routing, and other information.

Step S504, after receiving the announcement message, the DSLAM forwards it to the CPE, copies one copy to the CPU, and generates a prefix table based on the link prefix information in the announcement message.

The steps S502 and S504 correspond to steps S202 and S204 in FIG. 2.

Step S506, the DSLAM snoops into the announcement message and obtains routing information on a link.

Step S508, the CPE sends an internet-surfing request message to the DSLAM, if the source IP address of the message from the CPE exists in the network segment of the prefix table, then this message is forwarded.

Step S510, if the source IP address of the request message from the CPE does not exist in the network segment of the prefix table, then this message is discarded and blocked.

The steps S506-S510 correspond to steps S206 in FIG. 2.

According to the above method depicted in the embodiments of the present invention, the DSLAM can filter out a pseudo data packet coming from the CPE based on an announcement message issued from the router, which prevents malicious messages from entering into the network, thereby ensuring network security.

Apparatus Embodiments

According to embodiments of the present invention, an apparatus for realizing URPF is provided.

Figure 6:
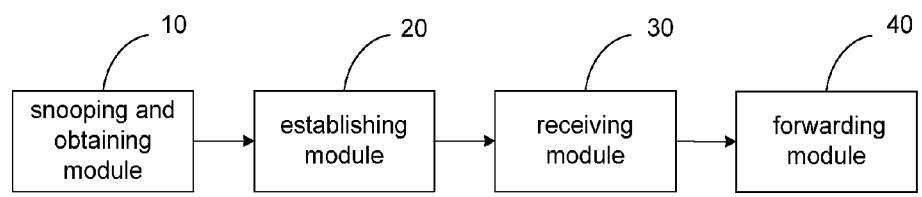
FIG. 6 is a block diagram of an apparatus for realizing URPF according to an embodiment of the present invention.
Figure 7:
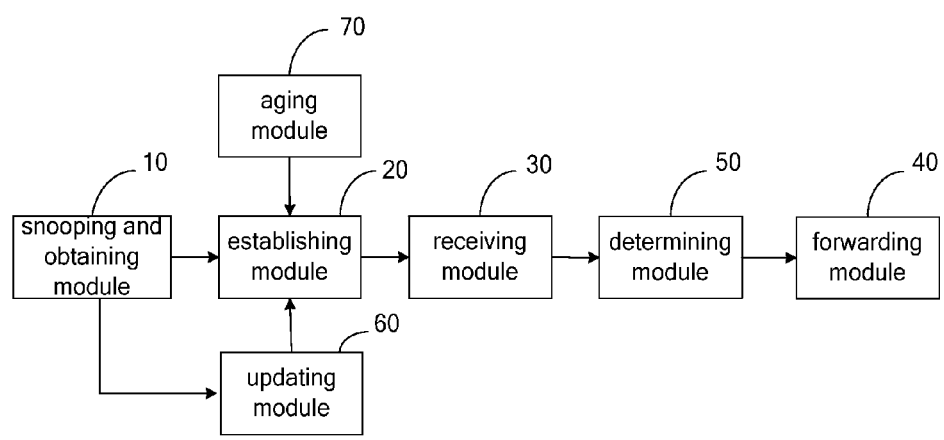
FIG. 7 is a block diagram of an apparatus for realizing URPF according to a preferred embodiment of the present invention.

FIG. 6 is a structure block diagram of an apparatus for realizing URPF according to an embodiment of the present invention; and FIG. 7 is a structure block diagram of an apparatus for realizing URPF according to a preferred embodiment of the present invention.

The apparatus for realizing URPF according to embodiments of the present invention can be applied in an IPv6 network, the IPv6 network at least comprises an access equipment, a router, and a customer premises equipment. During a specific implementation process, the above apparatus for realizing URPF may be arranged in the access equipment or arranged separately. As illustrated in FIG. 6, the apparatus comprises a snooping and obtaining module 10, an establishing module 20, a receiving module 30, and a forwarding module 40, wherein the snooping and obtaining module 10 is for snooping into and obtaining an announcement message from the router, wherein the announcement message contains address prefix information; the establishing module 20 connected to the snooping and obtaining module 10 is for establishing a prefix table based on the obtained address prefix information; the receiving module 30 connected to the establishing module 20 is for receiving an access request message from the customer premises equipment; and the forwarding module 40 connected to the receiving module 30 is for forwarding the message to the router under the condition that the source IP address of the access request message exists in the prefix table established by the establishing module. Preferably, the establishing module 20 transmits the established prefix table to the forwarding module 40 in a manner of ACL.

Preferably, as illustrated in FIG. 7, the apparatus may further comprise a determining module 50 connected to the receiving module 30 and the forwarding module 40 respectively, for determining whether the source IP address of an access request message exists in a prefix table established by the establishing module, and calling or triggering the forwarding module 40 if the result of determining is yes.

As illustrated in FIG. 7, preferably, the apparatus may further comprise an updating module 60 connected to the snooping and obtaining module 10 and the establishing module 20 respectively, for updating information recorded in a prefix table under the circumstances that an announcement message snooped into and obtained by the snooping and obtaining module 10 is sent by the router periodically according to a predetermined period, and if the snooping and obtaining module 10 obtains a new announcement message.

Preferably, the apparatus may further comprise an aging module 70 connected to the establishing module 20, for performing aging process to the recorded information that has not been updated within a predetermined time in a prefix table.

To sum up, with the above technical solution provided in the embodiments of the present invention, a pseudo data packet sent from a customer can be filtered out, thereby network security can be guaranteed; and in the technical solution according to embodiments of the present invention, address filtering requires no manual configuration, and an address filter table can be dynamically refreshed through automatic processing; and in addition, the technical solution provided in the embodiments of the present invention does not affect the forwarding capability of an existing device, and adds no additional load.

Apparently, those skilled in the art should understand, the modules or steps of the present invention may be implemented by a universal computing apparatus; they may be integrated in a single computing apparatus, or distributed in a network comprising a plurality of computing apparatuses; alternatively, they may be implemented with program codes executable by a computing apparatus, thus they may be stored in a storage apparatus and then executed by a computing apparatus; or they may be made into respective integrated circuit module, or a plurality of modules or steps thereof may be made into a single integrated circuit module. Therefore, the present invention is not limited to any particular combination of hardware and software.

What is described above are only preferred embodiments of the present invention, which are not for limiting the present invention. To those skilled in the art, the present invention may have various changes and alterations. Any modification, equivalent substitute, and improvement within the spirit and principle of the present invention should be included in the protection scope of the present invention.

What is claimed is:

1. A method for realizing unicast reverse path forwarding, applied in an IPv6 network comprising an access equipment, a router, and a customer premises equipment, the method comprising:

snooping into and obtaining, by the access equipment, an announcement message from the router, wherein the announcement message contains address prefix information;

establishing, by the access equipment, a prefix table based on the obtained address prefix information;

receiving, by the access equipment, an access request message from the customer premises equipment, determining whether a source IP address of the access request message exists in the prefix table, and deciding whether to forward the access request message to the router based on the result of determining; and under the circumstances that the announcement message snooped into and obtained by the access equipment is sent periodically by the router according to a predetermined period, and if the access equipment obtains a new announcement message, updating, by the access equipment, information recorded in the prefix table; and aging the information recorded in the prefix table if the information recorded in the prefix table is not updated within a predetermined time.

2. The method according to claim 1, wherein deciding whether to forward the message based on the result of determining comprises:

forwarding the message to the router if the result of determining is yes;

and discarding the message if the result of determining is no.

3. An apparatus for realizing unicast reverse path forwarding, applied in an IPv6 network comprising an access equipment, a router, and a customer premises equipment, the apparatus being arranged in the access equipment, and the apparatus comprising:

a snooping and obtaining equipment for snooping into and obtaining an announcement message from the router, wherein the announcement message contains address prefix information;

an establishing device for establishing a prefix table based on the obtained address prefix information;

a receiver for receiving an access request message from the customer premises equipment;

a forwarding engine for forwarding the access request message to the router if the source IP address of the access request message exists in the prefix table established by the establishing device;

an updating engine, connected to the snooping and obtaining equipment and the establishing device, for updating information recorded in the prefix table; and an aging device, wherein the aging device is connected to the establishing device, for aging recorded information which has not been updated within a predetermined time in the prefix table.

4. The apparatus according to claim 3, further comprising a determining device connected to the receiver and the forwarding engine, for determining whether a source IP address of the access request message exists in the prefix table established by the establishing device; and if the result of determining is yes, the forwarding engine is executed.

5. The apparatus according to claim 3, wherein the establishing device transmits the established prefix table to the forwarding engine in a manner of access control list.

* * * * *